US009875290B2

(12) United States Patent
Houde

(10) Patent No.: US 9,875,290 B2
(45) Date of Patent: Jan. 23, 2018

(54) METHOD, SYSTEM AND COMPUTER PROGRAM PRODUCT FOR USING AN INTERMEDIATION FUNCTION

(71) Applicant: DELOITTE IT INC, Toronto (CA)

(72) Inventor: Andre Houde, Montreal (CA)

(73) Assignee: DELOITTE IT INC., Toronto (CA)

( * ) Notice: Subject to any disclaimer, the term of this patent is extended or adjusted under 35 U.S.C. 154(b) by 315 days.

(21) Appl. No.: 14/460,427

(22) Filed: Aug. 15, 2014

(65) Prior Publication Data

US 2016/0050100 A1 Feb. 18, 2016

(51) Int. Cl.
*G06F 15/177* (2006.01)
*G06F 17/30* (2006.01)

(52) U.S. Cl.
CPC .. *G06F 17/30569* (2013.01); *G06F 17/30893* (2013.01)

(58) Field of Classification Search
CPC .............. G06F 17/30569; G06F 17/30893
USPC .................. 709/220, 228; 370/540, 254
See application file for complete search history.

(56) References Cited

U.S. PATENT DOCUMENTS

| 6,308,203 | B1 * | 10/2001 | Itabashi | G06F 17/30867 707/999.01 |
| 7,065,588 | B2 * | 6/2006 | Konda | G06F 17/30569 707/E17.006 |
| 7,145,898 | B1 * | 12/2006 | Elliott | H04L 12/66 370/352 |
| 7,801,905 | B1 * | 9/2010 | Singh | G06F 11/3438 707/661 |
| 7,933,965 | B2 * | 4/2011 | Bonar | G06F 8/35 709/208 |
| 7,954,152 | B2 * | 5/2011 | Shiran | H04L 63/1466 709/201 |
| 7,962,484 | B2 * | 6/2011 | Keni | G06F 17/30569 707/736 |
| 8,122,113 | B2 * | 2/2012 | Harrington | G06F 15/16 709/203 |
| 8,224,931 | B1 * | 7/2012 | Brandwine | H04L 41/5051 370/255 |
| 2002/0040359 | A1 * | 4/2002 | Green | G06F 17/2785 |
| 2002/0175211 | A1 * | 11/2002 | Dominquez | G06K 17/0022 235/492 |

(Continued)

*Primary Examiner* — Thu Ha Nguyen
(74) *Attorney, Agent, or Firm* — IP Delta Plus Inc.

(57) ABSTRACT

The present disclosure relates to methods and systems for generating an intermediation function and performing the intermediation function. The first method selects at least one command among a plurality of pre-defined commands stored at a configuration server, configures parameters of the at least one command, processes the at least one command to generate the intermediation function, transmits the intermediation function and the parameters to an intermediation platform, and stores the intermediation function and the parameters at the intermediation platform. The second method receives the intermediation function and parameters from the configuration server, stores the received intermediation function and the parameters at the intermediation platform, receives data from a user based on the parameters, processes the user data with the intermediation function based on the parameters, and transmits information generated by the processing of the user data to a database server.

20 Claims, 5 Drawing Sheets

(56) References Cited

U.S. PATENT DOCUMENTS

| | | | | |
|---|---|---|---|---|
| 2005/0021694 A1* | 1/2005 | Yuan | G06F 17/30893 | 709/220 |
| 2005/0049843 A1* | 3/2005 | Hewitt | G06F 17/5045 | 703/14 |
| 2006/0271689 A1* | 11/2006 | Kikuchi | G06F 21/41 | 709/227 |
| 2007/0121651 A1* | 5/2007 | Casey | G06F 17/30017 | 370/401 |
| 2007/0198432 A1* | 8/2007 | Pitroda | G06Q 20/02 | 705/64 |
| 2007/0203999 A1* | 8/2007 | Townsley | H04L 29/1282 | 709/207 |
| 2008/0019492 A1* | 1/2008 | Jyoti | H04L 12/66 | 379/100.01 |
| 2008/0059444 A1* | 3/2008 | Singh | G06F 17/30389 | |
| 2008/0271121 A1* | 10/2008 | Hinton | H04L 63/0815 | 726/4 |
| 2009/0065580 A1* | 3/2009 | Davies | G06K 17/00 | 235/385 |
| 2009/0182606 A1* | 7/2009 | Chug | G06Q 10/06 | 705/7.38 |
| 2009/0204721 A1* | 8/2009 | Yost | H04W 99/00 | 709/232 |
| 2009/0271470 A1* | 10/2009 | Hatanaka | G06F 9/465 | 709/202 |
| 2009/0296673 A1* | 12/2009 | Beach | H04W 4/20 | 370/338 |
| 2010/0030875 A1* | 2/2010 | Visser | H04L 41/0806 | 709/220 |
| 2010/0138817 A1* | 6/2010 | Dubinsky | G06F 11/3644 | 717/148 |
| 2010/0280961 A1* | 11/2010 | Thyni | G06Q 50/188 | 705/80 |
| 2010/0291943 A1* | 11/2010 | Mihaly | H04L 29/12066 | 455/450 |
| 2012/0079095 A1* | 3/2012 | Evans | G06F 8/61 | 709/224 |
| 2012/0079126 A1* | 3/2012 | Evans | G06F 9/4443 | 709/230 |
| 2012/0144033 A1* | 6/2012 | Daude | H04L 29/12009 | 709/224 |
| 2012/0278494 A1* | 11/2012 | Short | H04L 12/14 | 709/230 |
| 2013/0060836 A1* | 3/2013 | Bowers | H04L 41/0286 | 709/203 |
| 2013/0212576 A1* | 8/2013 | Huang | G06F 9/45558 | 718/1 |
| 2013/0262510 A1* | 10/2013 | Smith | G06F 17/30283 | 707/770 |
| 2014/0082715 A1* | 3/2014 | Grajek | H04L 63/0815 | 726/8 |
| 2014/0372262 A1* | 12/2014 | Young | G06Q 10/1091 | 705/30 |
| 2015/0172747 A1* | 6/2015 | Huang | H04N 21/4331 | 725/100 |
| 2016/0012504 A1* | 1/2016 | Karaoguz | G06Q 30/0611 | 705/26.4 |
| 2016/0050100 A1* | 2/2016 | Houde | G06F 17/30569 | 709/220 |
| 2016/0150043 A1* | 5/2016 | Petronic | H04L 61/2546 | 709/220 |

* cited by examiner

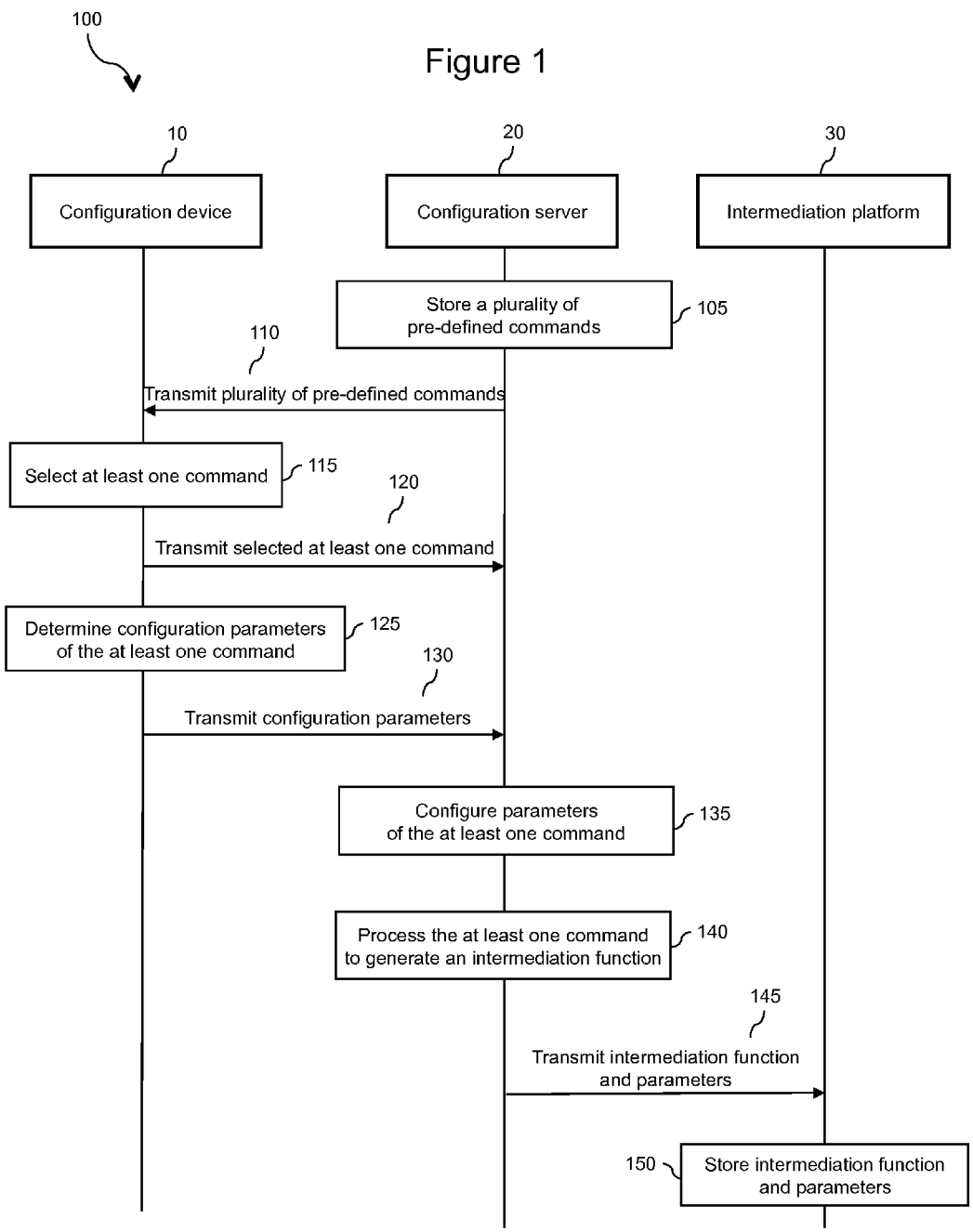

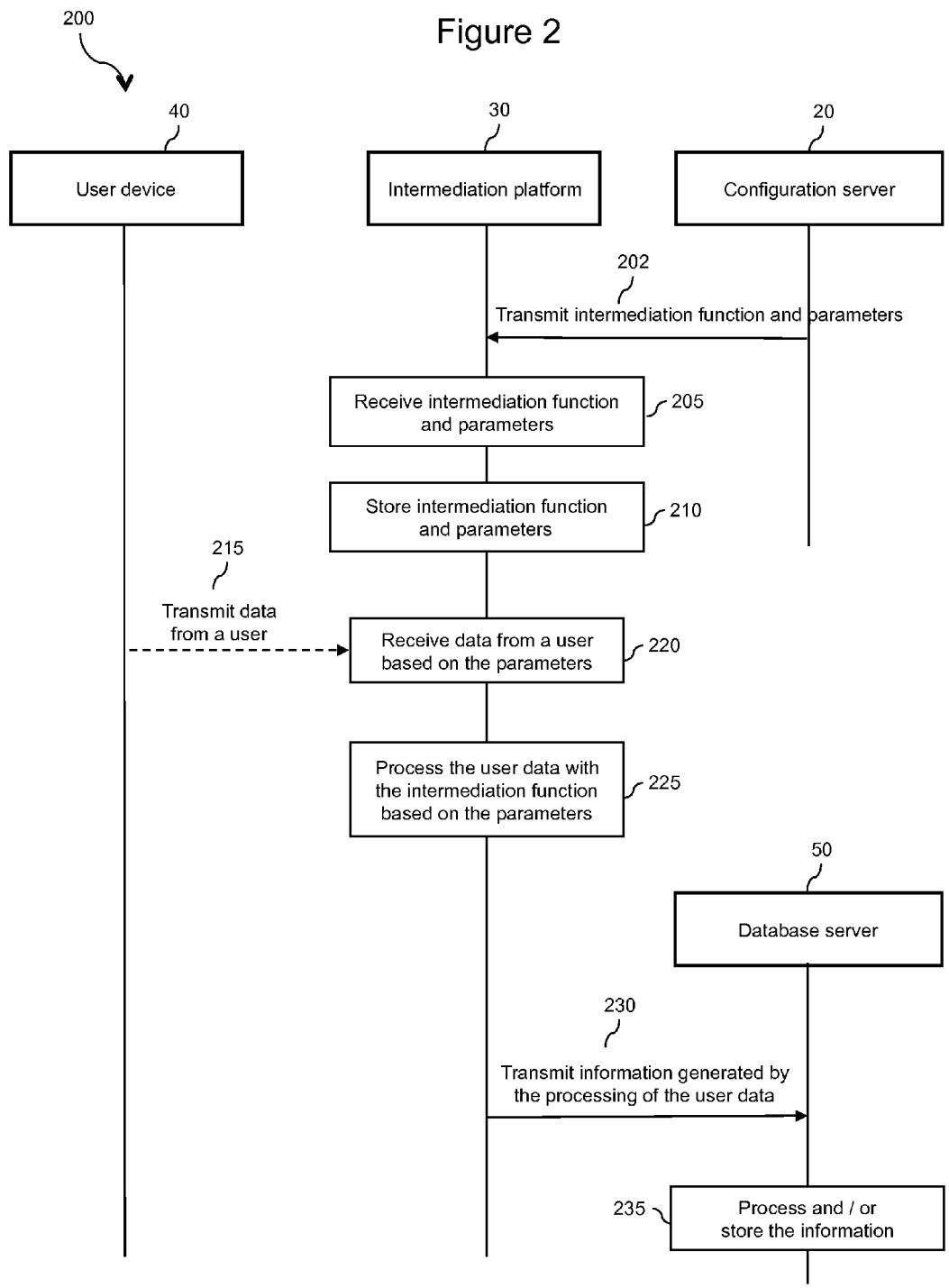

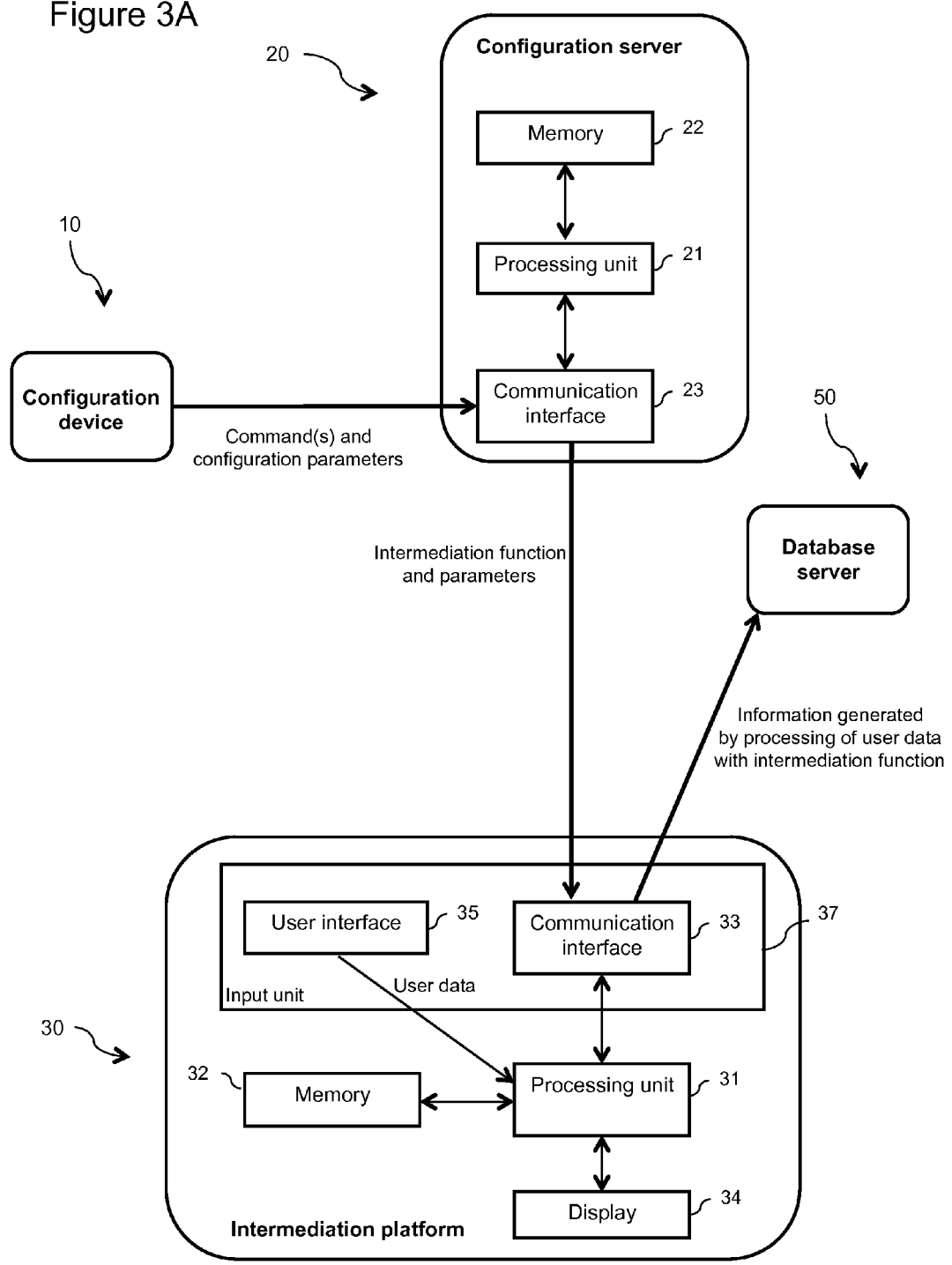

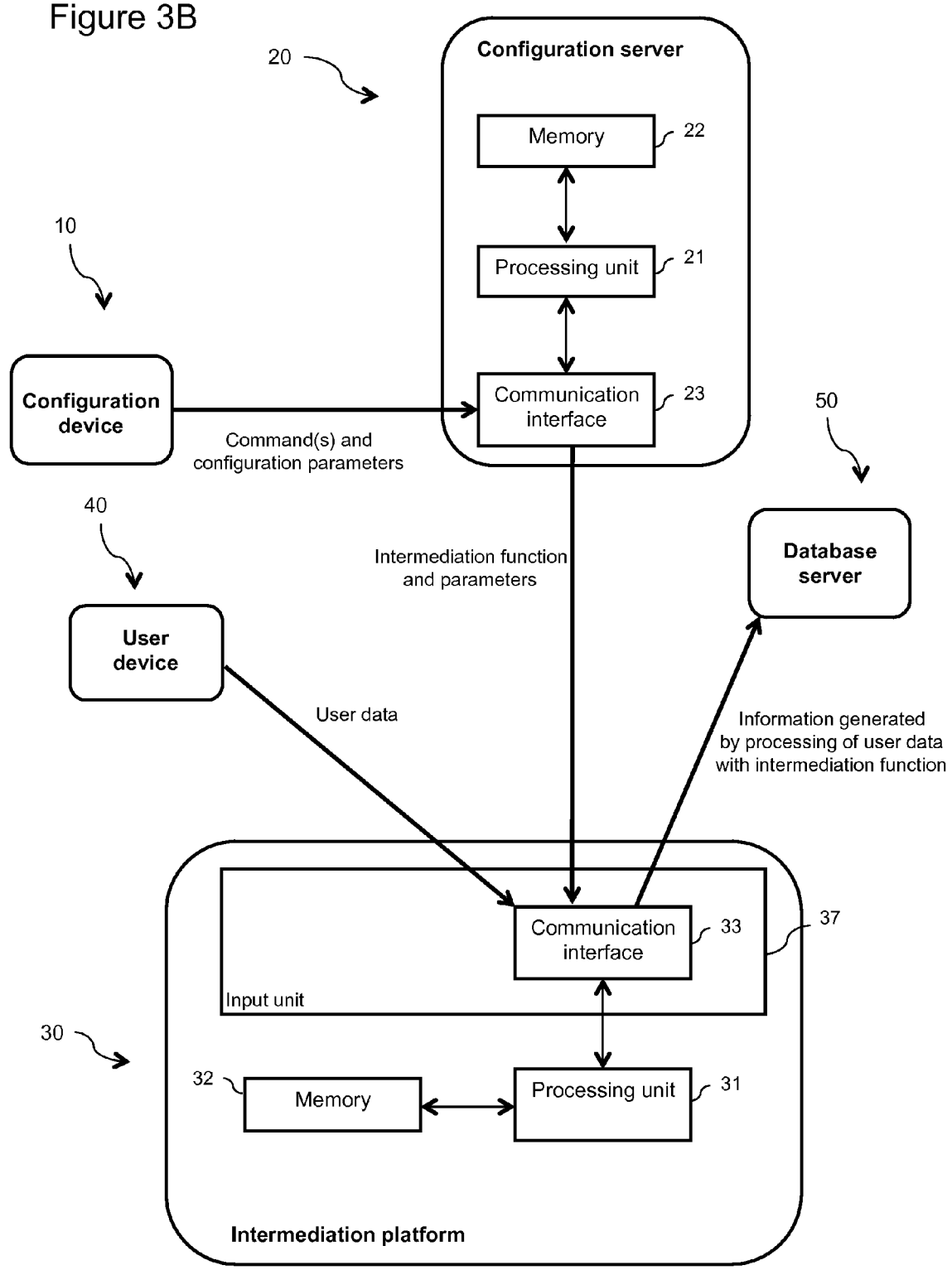

METHOD, SYSTEM AND COMPUTER PROGRAM PRODUCT FOR USING AN INTERMEDIATION FUNCTION

TECHNICAL FIELD

The present disclosure relates to the field of adaptive data processing. More specifically, the present disclosure relates to a method, system and computer program product for using an intermediation function.

BACKGROUND

Central software systems are used for collecting and processing data from a large number of users. For example, the amount of time spent on various tasks by a plurality of users is collected via a central software system and stored in a database. In this context, the data collected from the users consist in time entries which can be collected via a timesheet generated by the central software system. Each employee in a company autonomously provides its own time entries to the central software system via the timesheet. The type and format of the information stored in the database (e.g. time entries) are specific and defined by a particular data model. In many cases, the type and format of the data collected (e.g. time entries) from the users by the central software system mirror the specific type and format of the information stored in the database. Thus, the user needs to adapt to the complexity of the data model in order to be able to enter the appropriate data (e.g. time entries) in the central software system. Consequently, each user may need to follow a specific training to understand how data (e.g. time entries) shall be entered in the central software system. However, even with this training, the complexity of the data model may trigger a significant amount of errors when the users enter the data (e.g. time entries).

In order to simplify data collection, an adaptive software can be developed. The adaptive software is executed by the central software system. The adaptive software provides an interface for collecting data from the user in a simplified manner, and processes the collected data to adapt them to the data model of the database. However, if various companies use the same database but different data models for recording the amount of time spent on various tasks by their employees, a custom adaptive software needs to be developed for each company. Developing a custom software for each company can be a complex, lengthy and costly process.

Additionally, in the case of the collection of the amount of time spent on various tasks by a plurality of users, the collected data (the time entries) may be used for various purposes: payroll, billing, project management, etc. Thus, the user may be required to enter several times the same type of data (but in different formats) in the central software system, because the information stored in the database have a particular data model for payroll, billing, project management, etc. A custom adaptive software may also be developed and executed by the central software system in this case. The custom adaptive software collects data in a common format from the users, and processes the collected data to adapt them to the specificities of payroll, billing, project management, etc.

Thus, there is a need for a more effective way of adapting a central software system to a specific use case, in order to facilitate data entry by users of the central software system and adaptive processing of the collected data. There is therefore a need for a method, system and computer program product for using an intermediation function.

SUMMARY

According to a first aspect, the present disclosure relates to a method for generating an intermediation function. The method selects at least one command among a plurality of pre-defined commands stored at a configuration server. The method executes instructions, by a processing unit of the configuration server, for configuring parameters of the at least one command. The method executes instructions, by the processing unit of the configuration server, for processing the at least one command to generate the intermediation function. The method transmits the intermediation function and the parameters to an intermediation platform. The method stores the intermediation function and the parameters at the intermediation platform.

According to a second aspect, the present disclosure relates to a method for performing an intermediation function. The method receives the intermediation function and parameters from a configuration server. The method stores the intermediation function and the parameters at an intermediation platform. The method receives data from a user based on the parameters. The method executes instructions, by a processing unit of the intermediation platform, for processing the user data with the intermediation function based on the parameters. The method transmits information generated by the processing of the user data to a database server.

According to a third aspect, the present disclosure provides an intermediation platform. The intermediation platform comprises an input unit, memory, and a processing unit. The input unit receives an intermediation function and parameters from a configuration server. The input unit also receives data from a user based on the parameters. The memory is for storing the intermediation function and the parameters. The processing unit stores the received intermediation function and parameters in the memory. The processing unit also executes instructions for processing the user data with the intermediation function based on the parameters. The processing unit further transmits information generated by the processing of the user data to a database server.

According to a fourth aspect, the present disclosure relates to a computer program product deliverable via an electronically-readable media such as storage media and communication links, the computer program product comprising instructions for performing an intermediation function that when executed by a processor perform the aforementioned method for performing an intermediation function.

BRIEF DESCRIPTION OF THE DRAWINGS

Embodiments of the disclosure will be described by way of example only with reference to the accompanying drawings, in which:

FIG. 1 illustrates a method for generating an intermediation function;

FIG. 2 illustrates a method for performing an intermediation function;

FIGS. 3A and 3B illustrate a system for using an intermediation function; and

DETAILED DESCRIPTION

Figure 4:
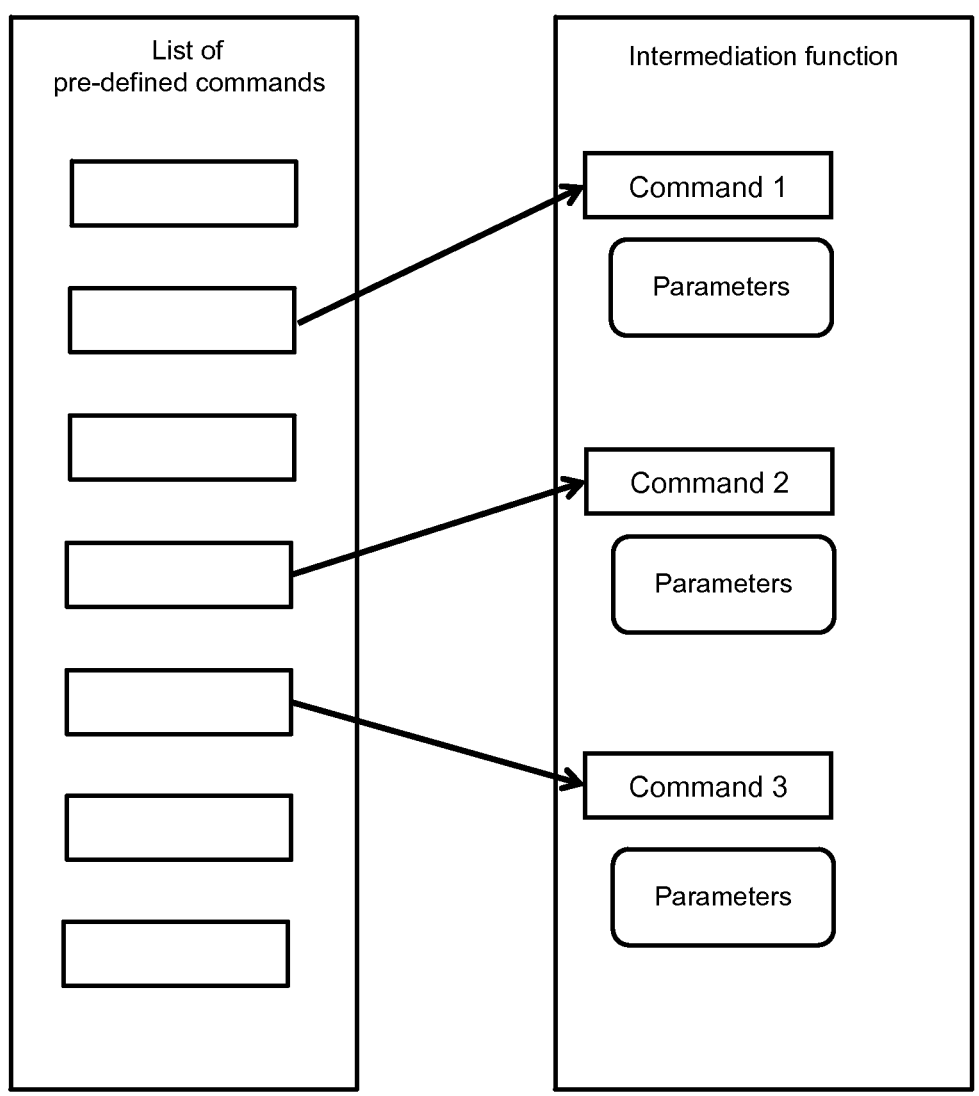
FIG. 4 illustrates a configuration file of an intermediation function.

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to adaptive data processing.

The present disclosure describes two methods for using an intermediation function. The first method consists in generating the intermediation function. A customized intermediation function is generated, which provides a specific set of functionalities via pre-defined commands, is capable of processing specific user data, and generates information compatible with a particular database format. The second method consists in performing the intermediation function. Thus, the second method consists in collecting the user data, processing the collected user data, and transmitting the information generated by the processing of the user data to a database server. The two methods can be implemented independently from one another. However, the customized intermediation function generated by the first method is used by the second method.

The term intermediation function is used in contrast to a software code. Instead of developing a dedicated software code for each specific use case where data collected from users need to be adapted and processed before being stored in a specific database, an intermediation function is used. The intermediation function does not consist of a software code, but of a specific set of pre-defined commands and corresponding parameters. The intermediation function is interpreted by an engine operating at an intermediation platform, as will be detailed later in the description.

Referring now concurrently to FIGS. 1 and 3A-B, a method 100 for generating an intermediation function and a system for implementing the method 100 are represented.

The system for implementing the method 100 comprises a configuration server 20, a configuration device 10, and an intermediation platform 30.

The configuration server 20 comprises a processing unit 21, having one or more processors (not represented in FIGS. 3A-B) capable of executing instructions of a computer program. Each processor may further have one or several cores. The configuration server 20 also comprises memory 22 for storing instructions of the computer program, data generated by the execution of the computer program, etc. Only a single memory 22 is represented in FIGS. 3A-B, but the configuration server 20 may comprise several types of memories, including volatile memory (such as a volatile Random Access Memory (RAM)) and non-volatile memory (such as a hard drive). The configuration server 20 further comprises a communication interface 23 for exchanging data with other entities (such as the configuration device 10 and the intermediation platform 30) through communication links not represented in FIGS. 3A-B (e.g. a cellular network, a fixed Internet network, etc.).

The intermediation platform 30 will be detailed later in the description, in relation to FIG. 2. The configuration device 10 comprises a processing unit, memory and a communication interface for exchanging data with the configuration server 20. The configuration device 10 also comprises a display and a user interface for allowing an administrator to interact with the configuration server 20 via the configuration device 10. The aforementioned components of the configuration device 10 are not represented in FIGS. 3A-B for simplification purposes. The configuration device 10 may consist of a desktop, a laptop, a tablet, a smartphone, etc.

In the rest of the description, the term administrator is used in reference to a person interacting with the configuration server 20, while the term user is used in reference to a person interacting with the intermediation platform 30.

We now refer to instructions of a specific computer program. The instructions of the specific computer program implement the steps of the method 100 for generating the intermediation function that are performed by the configuration server 20. The instructions are comprised in a computer program product and provide for generating the intermediation function, when executed by a processor of the processing unit 21 of the configuration server 20. The computer program product is deliverable via an electronically-readable media such as a storage media or via communication links (through the communication interface 23).

The configuration server 20 represented in FIGS. 3A-B is for exemplary purposes only, and is not intended to limit the scope of the present disclosure. The configuration server 20 may include additional components, such as a display, a user interface, etc. Examples of configuration servers 20 include a dedicated computing system implementing the server functionality, a standard desktop or laptop adapted to implement the server functionality, etc.

The method 100 comprises the step of selecting at least one command among a plurality of pre-defined commands stored at the configuration server 20. For example, as illustrated in FIG. 1, the configuration server 20 stores 105 the plurality of pre-defined commands in the memory 22. The configuration server 20 transmits 110 the plurality of pre-defined commands to the configuration device 10 via the communication interface 23. Although not represented in FIG. 1, the transmission 110 may triggered by a request from the configuring device 10 to the configuration server 20. The configuration device 10 selects 115 at least one command among the plurality of pre-defined commands. For this purpose, the plurality of pre-defined commands are displayed on the display of the configuration device 10 (e.g. via a dedicated graphical user interface) and an administrator selects the at least one command via the user interface (e.g. a mouse, a trackpad, a touchscreen, etc.) of the configuration device 10. The configuration device 10 transmits 120 the selected at least one command to the configuration server 20.

An intermediation function may comprise one or more commands, and the administrator (via the configuration device 10) selects the one or more commands among the plurality of pre-defined commands based on the specific intermediation function that needs to be generated. The pre-defined commands constitute a library of standardized commands, each standardized command having a particular functionality. A subset of the standardized commands can be assembled to generate an intermediation function having a global functionality, which is a combination of the functionalities of the selected commands. Examples of standardized commands include: collection of credentials of a user, collection of user data, verification of user credentials, verification of user data, processing of user data, connection to a computing device, exchange of information with a computing device, etc. A specific command may receive inputs and generate outputs. The order of selection of the commands can be used to determine the inputs and outputs of a command. For instance, the inputs of a particular command correspond to the outputs of the previous command and the outputs of the particular command correspond to the inputs of the next command.

The method 100 comprises the step of executing instructions by the processing unit 21 of the configuration server 20 for configuring 135 parameters of the selected at least one command. For example, the configuration device 10 determines 125 configuration parameters of the selected at least one command. For this purpose, for each command selected at step 115, available parameters are displayed on the display of the configuration device 10 (e.g. via a dedicated graphical user interface) and the administrator determines the parameters via the user interface of the configuration device 10. The configuration device 10 transmits 130 the configuration parameters to the configuration server 20, and the transmitted configuration parameters are processed by the configuration server 20 for configuring 135 the selected command(s). Some of the commands may not have configuration parameters, while other commands may have one or more configuration parameters. For each command selected at step 115 by the configuration device 10, the configuration server 20 transmits the available configuration parameters to the configuration device 10, for further determination 125 of the configuration parameters of the selected command.

Alternatively, the steps 115 and 125 may be performed directly at the configuration server 20 by an administrator, via a display and a user interface of the configuration server 20. In this case, no configuration device 10 is used and the steps 110, 120 and 130 are not performed.

The method 100 comprises the step of executing instructions by the processing unit 21 of the configuration server 20 for processing 140 the at least one command to generate the intermediation function. For example, the processing 140 may consist in generating a configuration file corresponding to the intermediation function. The configuration file comprises a list of the selected commands, and the configuration parameters for each selected command. The configuration file is generated in a particular format, which can be processed by the intermediation platform 30. The format of the configuration file may be a spreadsheet model, for example an Excel® spreadsheet. The list of the selected commands may be written in an encrypted format, which can be interpreted by the intermediation platform 30.

The method 100 comprises the step of transmitting 145 the intermediation function and the parameters from the configuration server 20 (via the communication interface 23) to the intermediation platform 30. For example, the configuration file comprising the list of the selected commands, and the configuration parameters for each selected command is transmitted at step 145. Additionally, executable code corresponding to the selected commands may be transmitted at step 145. The executable code can be in the form of a binary code or an executable script. Alternatively, the executable code corresponding to all the pre-defined commands is stored at the intermediation platform 30, and the intermediation platform 30 is capable of executing the executable code of each selected command of the configuration file. In both cases, the executable code corresponding to a particular command is fixed and does not need to be modified, recompiles, etc., to adapt to each specific intermediation function incorporating the particular command.

The method 100 further comprises the step of storing 150 the intermediation function and the parameters at the intermediation platform 30. For example, the configuration file comprising the list of the selected commands, and the configuration parameters for each selected command is stored at step 150.

In a particular aspect, configuring 135 parameters of the selected at least one command comprises defining a graphical user interface (GUI) of a selected command. The definition of the GUI comprises defining which data are entered via the GUI, the type of the data, the format of the data, the possible range of values of the data, etc. The data entered via the GUI are processed by the corresponding selected command. A specific intermediation function may include one or more commands for which a particular GUI is defined via corresponding particular parameters.

Furthermore, a specific GUI may be defined for a specific type of user. For instance, a command of the intermediation function may be capable of processing data from different types of users. Thus, parameters are used to customize the GUI associated to the command for each different type of users. The customization may consist in collecting different types of data for each type of user, adapting the range of acceptable values of a particular data to each type of user, etc.

In another particular aspect, configuring 135 parameters of the selected at least one command comprises allocating a pre-defined value to a data used by a command. Since a particular command may be included in different intermediation functions, a data used by the particular command is allocated a value corresponding to the specific context of a specific intermediation function. For example, in the context of a time tracking application, different intermediation functions are generated for different companies, and the intermediation functions may include a command for calculating billable hours of the employees. The command uses data defining the hourly rates of the employees of each company for calculating the billable hours. The data defining the hourly rates are allocated specific pre-defined values for each specific company.

Furthermore, a specific pre-defined value may be allocated for a specific type of user. For example, in the previous example of the time tracking application, the hourly rates of the employees of a company vary according to the various types of employees. Thus, for the command for calculating the billable hours of the employees, the data defining the hourly rates are allocated specific pre-defined values which depend on the various types of employees of the company. The command has a GUI for selecting a type of employee among a pre-defined list of types of employees, and based on the selection of the type of employee, the appropriate pre-defined value of the hourly rate is used for calculating the billable hours of a particular employee of the company.

In still another particular aspect, the intermediation function comprises converting user data from a first format to a second format compatible with a particular database. This aspect will be detailed later in the description, in relation to FIG. 2.

Referring now concurrently to FIGS. 2 and 3A-B, a method 200 for performing an intermediation function and a system for implementing the method 200 are represented.

The system for implementing the method 200 comprises the configuration server 20, the intermediation platform 30, a database server 50 and may comprise a user device 40. The configuration server 20 has already been detailed in relation to FIG. 1.

The intermediation platform 30 comprises a processing unit 31, having one or more processors (not represented in FIGS. 3A-B) capable of executing instructions of a computer program. Each processor may further have one or several cores. The intermediation platform 20 also comprises memory 32 for storing instructions of the computer program, data generated by the execution of the computer program, etc. Only a single memory 32 is represented in FIGS. 3A-B, but the intermediation platform 30 may comprise several types of memories, including volatile memory (such as a volatile Random Access Memory (RAM)) and non-volatile memory (such as a hard drive). The intermediation platform 30 further comprises an input unit 37. In the embodiment of FIG. 3A, the input unit 37 includes a communication interface 33 for exchanging data with other entities (such as the configuration server 20 and the database server 40) through communication links not represented in FIG. 3A (e.g. a cellular network, a fixed Internet network, etc.). The input unit 37 also comprises a user interface 35 for receiving data from a user. In the embodiment of FIG. 3B, the input unit 37 includes a communication interface 33 for exchanging data with other entities (such as the configuration server 20, the user device 40 and the database server 40) through communication links not represented in FIG. 3B. In the embodiment illustrated in FIG. 3A, the intermediation platform 30 further comprises a display 34 for displaying information to a user and interacting with the user via a GUI.

The user device 40 represented in FIG. 3B comprises a processing unit, memory and a communication interface for exchanging data with the intermediation platform 30. The user device 40 also comprises a display and a user interface for allowing a user to interact with the intermediation platform 30 via the user device 40. The aforementioned components of the user device 40 are not represented in FIG. 3B for simplification purposes. The user device 40 may consist of a desktop, a laptop, a tablet, a smartphone, etc.

The database server 50 comprises a processing unit, memory and a communication interface for exchanging data with the intermediation platform 30. The aforementioned components of the database server 50 are not represented in FIGS. 3A-B for simplification purposes. The database server 50 may consist of a dedicated computing system implementing a database functionality, a standard desktop or laptop adapted to implement a database functionality, etc. The database functionality is implemented by executing instructions by the processing unit of a database software and storing information of the database in the memory.

We now refer to instructions of a specific computer program. The instructions of the specific computer program implement the steps of the method 200 for performing the intermediation function that are performed by the intermediation platform 30. The instructions are comprised in a computer program product and provide for performing the intermediation function, when executed by a processor of the processing unit 31 of the intermediation platform 30. The computer program product is deliverable via an electronically-readable media such as a storage media or via communication links (through the communication interface 33).

The intermediation platform 30 represented in FIGS. 3A-B is for exemplary purposes only, and is not intended to limit the scope of the present disclosure. The intermediation platform 30 may include additional components. Examples of intermediation platforms 30 include a dedicated computing system (such as a server) implementing the intermediation functionality, a standard desktop or laptop adapted to implement the intermediation functionality, etc.

The method 200 comprises the step of receiving 205 an intermediation function and parameters from the configuration server 20. The intermediation function and the parameters are transmitted 202 by the configuration server 20 via its communication interface 23 to the input unit 37 of the intermediation platform 30. The intermediation function and the parameters are received via the communication interface 33 of the input unit 37. As mentioned previously, the intermediation function and the parameters may be transmitted in the form of a configuration file having a particular format, which can be processed by the intermediation platform 30.

The method 200 comprises the step of storing 210 the intermediation function and the parameters in the memory 32 of the intermediation platform 30. The step 210 is performed by the processing unit 31 of the intermediation platform 30.

The method 200 comprises the step of receiving 220 data from a user based on the parameters. The parameters define which user data can be received and how they can be received. The user data are received via the input unit 37. In the embodiment illustrated in FIG. 3A, the user data are received directly at the intermediation platform 30, via the user interface 35 of the input unit 37. In the embodiment illustrated in FIG. 3B, the user data are received directly at the user device 40 via the user interface of the user device 40, transmitted 215 to the intermediation platform 30 via the communication interface of the user device 40, and received at the intermediation platform 30 via the communication interface 33 of the input unit 37.

The method 200 comprises the step of executing instructions by the processing unit 31 of the intermediation platform 30 for processing 225 the user data with the intermediation function based on the parameters. The parameters determine how the user data are processed by the intermediation function. The intermediation function may comprise a plurality of pre-defined commands for processing the user data, as has been previously described in relation to FIG. 1. Each specific command among the plurality of pre-defined commands has its own specific parameters, for determining how the command is applied and how the user data are processed by the specific command. Each pre-defined command may have zero, one or more parameters.

The steps 220 and 225 of the method 200 are performed by an engine capable of interpreting the intermediation function and the parameters, to collect the user data and process the collected user data, according to the parameters. The engine may consist in a dedicated application (specifically developed to interpret and process the commands and the parameters of the intermediation function), a web server (the commands can be in the form of scripts executable by the web server), the Excel® application (the commands of the intermediation function and the parameters are in the format of an Excel® spreadsheet), etc.

The method 200 comprises the step of transmitting 230 information generated by the processing of the user data with the intermediation function from the intermediation platform 30 (via the communication interface 33) to the database server 50.

The transmitted information are further processed and/or stored 235 at the database server 50.

In a particular aspect, the parameters comprise a definition of a graphical user interface (GUI) and receiving data from a user based on the parameters comprises receiving data via the defined GUI. In the embodiment illustrated in FIG. 3A, the GUI is displayed on the display 34 and the data are entered by the user via the user interface 35. In the embodiment illustrated in FIG. 3B, the definition of the GUI is transmitted (via the communication interface 33) by the intermediation platform 30 to the user device 40. The GUI is displayed on the display of the user device 40 and the data are entered by the user via the user interface of the device 40. The user data are then transmitted from the user device 40 to the intermediation platform 30 (via the communication interface 33). Furthermore, a specific GUI may be used for a specific type of user.

For example, the GUI may be defined as follows. A first level of the GUI allows a user to select between several types of user. Based on the selected type of user, a second level of the GUI allows the user to enter one or several data. The data to be entered depend on the selected type of user. For example, the data may include user credentials, which are further verified by one of the commands of the intermediation function. User credentials may not be required for specific types of user, while they are required for other types of user. Data, which are further processed by the commands of the intermediation function, are also collected; and may also depend on the selected type of user. As mentioned previously, the definition of the GUI comprises a definition of each data collected with the GUI, including the type of the data, the format of the data, the possible range of values of the data, etc. Additionally, the definition of the GUI may include a definition of the visual aspect of the GUI: which type of graphical element (e.g. a menu, a text entry, etc.) is used for collecting a particular user data. Alternatively, the graphical elements for generating the GUI may be determined automatically, based on the type of the data, the format of the data, the possible range of values of the data, to be collected.

In another particular aspect, the parameters comprise a pre-defined value of a data used by a particular command among the plurality of pre-defined commands. Processing the user data with the intermediation function based on the parameters comprises processing the user data and the pre-defined value by the particular command.

A particular command of the intermediation function processes at least one of, or a combination of: one or several user data, one or several pre-defined values, one or several outputs of another command of the intermediation function. The processing generates zero, one or more, outputs; which can be either used as input by another command of the intermediation function, or which consist in the information transmitted 230 to the database server 50.

Furthermore, a specific pre-defined value may be used for a specific type of user. For instance, the user selects a type of user with the aforementioned GUI, and based on the selected type of user, a particular pre-defined value is used among a plurality of available pre-defined values.

In still another particular aspect, processing 225 the user data with the intermediation function comprises converting the user data from a first format to a second format compatible with a database hosted by the database server 50. This functionality allows to hide the complexity of a data model of the database from the users. The first format used for entering the user data is a simple format, easily understandable by the user. The user data entered in this format are processed with one or several commands of the intermediation function, to convert them in a second format compatible with the data model of the database.

In yet another particular aspect, processing 225 the user data with the intermediation function comprises verifying a validity of the user data.

In another particular aspect, processing 225 the user data with the intermediation function comprises testing the user data.

Referring now to FIG. 4, an exemplary configuration file of an intermediation function is represented. The configuration file comprises three commands (command 1, command 2 and command 3) which have been selected form a list of pre-defined commands. For each command, the configuration file comprises a list of parameters (there may be zero, one or more parameters per command). Each particular command (e.g. command 1) has a specific list of parameters, which are defined during the generation of the intermediation function. As mentioned previously, examples of parameters of a command include a definition of a GUI associated to the command, a pre-defined value of a data processed by the command, etc.

The commands of the intermediation function may be executed sequentially. In this case, the order of the commands in the configuration file determines the order of execution of the commands, and the outputs (if any) of a particular command consist in inputs of the next command. The outputs of the last command are the information transmitted to the database server. A GUI may be associated to one or several specific commands, for collecting the user data processed by the specific command. Some commands may not process user data, but only process parameters (pre-defined values) or outputs of the preceding command.

Alternatively, some of the commands of the intermediation function may be executed in parallel. In this case, the configuration file comprises additional information for determining dependencies between the commands and a particular sequence of execution of the various commands.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for generating an intermediation function, the method comprising:
selecting at least one command among a plurality of pre-defined commands stored at a configuration server, each of the at least one command corresponding to executable code executable by an intermediation platform;
executing instructions by a processing unit of the configuration server for configuring parameters of the at least one command, the configuration of the parameters comprising defining a graphical user interface (GUI) for the at least one command, the definition of the GUI comprising defining different customized instances of the GUI for different types of users;
executing instructions by the processing unit of the configuration server for processing the at least one command to generate the intermediation function;
transmitting the intermediation function and the parameters to the intermediation platform.

2. The method of claim 1, wherein configuring parameters of the at least one command comprises allocating a pre-defined value to a data used by the at least one command.

3. The method of claim 2 wherein a specific pre-defined value is allocated for a specific type of user.

4. The method of claim 1, wherein the intermediation function comprises converting user data from a first format to a second format compatible with a particular database.

5. The method of claim 1, wherein the definition of the GUI comprises at least one of the following: a type of data entered via the GUI, a format of data entered via the GUI, a range of values of data entered via the GUI, and a visual aspect of the GUI.

6. The method of claim 1, wherein defining different customized instances of the GUI for different types of users comprises at least one of the following: collecting different types of data via the different customized instances of the GUI for each of the different types of users, and adapting the range of acceptable values of a type of data collected via the different customized instances of the GUI for each of the different types of users.

7. A method for performing an intermediation function, the method comprising:

receiving by an intermediation platform the intermediation function and parameters from a configuration server, the intermediation function comprising a plurality of pre-defined commands for processing user data, each of the plurality of pre-defined commands corresponding to executable code executable by the intermediation platform, the parameters comprising a definition of a graphical user interface (GUI), the definition of the GUI comprising defining different customized instances of the GUI for different types of users;

storing the intermediation function and the parameters at the intermediation platform;

selecting a type of user among the different types of users;

receiving by the intermediation platform the user data from a user based on the parameters, at least some of the user data being received from the user via the customized instance of the GUI corresponding to the selected type of user; and processing by the intermediation platform the user data with the intermediation function based on the parameters, the processing comprising executing for each command of the plurality of pre-defined commands of the intermediation function instructions of the executable code corresponding to the command by a processing unit of the intermediation platform for processing the user data based on the parameters.

8. The method of claim 7, wherein the parameters comprise a pre-defined value of a data used by a particular command among the plurality of pre-defined commands and processing the user data with the intermediation function based on the parameters comprises processing the user data and the pre-defined value by the particular command.

9. The method of claim 8 wherein a specific pre-defined value is used for a specific type of user.

10. The method of claim 7, wherein processing the user data with the intermediation function comprises converting the user data from a first format to a second format compatible with a database hosted by the database server.

11. The method of claim 7, wherein processing the user data with the intermediation function comprises verifying a validity of the user data.

12. The method of claim 7, wherein processing the user data with the intermediation function comprises testing the user data.

13. The method of claim 7, further comprising transmitting information generated by the processing of the user data to a database server.

14. The method of claim 7, wherein the definition of the GUI comprises at least one of the following: a type of data entered via the GUI, a format of data entered via the GUI, a range of values of data entered via the GUI, and a visual aspect of the GUI.

15. The method of claim 7, wherein the definition of the GUI comprises at least one of the following: collecting different types of data via the different customized instances of the GUI for each of the different types of users, and adapting the range of acceptable values of a type of data collected via the different customized instances of the GUI for each of the different types of users.

16. An intermediation platform, the platform comprising:
an input unit memory; and
a processing unit for:
receiving an intermediation function and parameters from a configuration server via the input unit, the intermediation function comprising a plurality of pre-defined commands for processing user data, each of the plurality of pre-defined commands corresponding to executable code executable by the intermediation platform, the parameters comprising a definition of a graphical user interface (GUI), the definition of the GUI comprising defining different customized instances of the GUI for different types of users;

storing the received intermediation function and parameters in the memory;

selecting a type of user among the different types of users;

receiving the user data from a user based on the parameters via the input unit, at least some of the user data being received from the user via the customized instance of the GUI corresponding to the selected type of user;

processing the user data with the intermediation function based on the parameters, the processing comprising executing for each command of the plurality of pre-defined commands of the intermediation function instructions of the executable code corresponding to the command by the processing unit for processing the user data based on the parameters; and transmitting information generated by the processing of the user data to a database server.

17. The intermediation platform of claim 16, wherein the parameters comprise a pre-defined value of a data used by a particular command among the plurality of pre-defined commands and processing the user data with the intermediation function based on the parameters comprises processing the user data and the pre-defined value by the particular command.

18. The intermediation platform of claim 16, wherein the definition of the GUI comprises at least one of the following: a type of data entered via the GUI, a format of data entered via the GUI, a range of values of data entered via the GUI, and a visual aspect of the GUI.

19. A computer program product comprising instructions store in a storage media which when executed by a processing unit of an intermediation platform provide for performing an intermediation function by:

receiving by the intermediation platform the intermediation function and parameters from a configuration server, the intermediation function comprising a plurality of pre-defined commands for processing user data, each of the plurality of pre-defined commands corresponding to executable code executable by the intermediation platform, the parameters comprising a definition of a graphical user interface (GUI), the definition of the GUI comprising defining different customized instances of the GUI for different types of users;

storing the intermediation function and the parameters at the intermediation platform;

selecting a type of user among the different types of users;

receiving by the intermediation platform the user data from a user based on the parameters, at least some of the user data being received from the user via the customized instance of the GUI corresponding to the selected type of user;

processing by the intermediation platform the user data with the intermediation function based on the parameters, the processing comprising executing for each command of the plurality of pre-defined commands of the intermediation function instructions of the executable code corresponding to the command by the processing unit of the intermediation platform for processing the user data based on the parameters; and transmitting information generated by the processing of the user data to a database server.

20. The computer program product of claim 19, wherein the definition of the GUI comprises at least one of the following: a type of data entered via the GUI, a format of data entered via the GUI, a range of values of data entered via the GUI, and a visual aspect of the GUI.

* * * * *